United States Patent
Zhang et al.

(10) Patent No.: US 8,592,704 B2
(45) Date of Patent: *Nov. 26, 2013

(54) ELECTRONIC DEVICE WITH SWITCHES TO SELECTIVELY CONTROL SAFE ACCESS

(75) Inventors: Jun-Xiong Zhang, Shenzhen (CN); Zhi-Xin Li, Shenzhen (CN); Bang-Wei Wang, Shenzhen (CN); You-Tao Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 174 days.

This patent is subject to a terminal disclaimer.

(21) Appl. No.: 13/220,700

(22) Filed: Aug. 30, 2011

(65) Prior Publication Data

US 2012/0186960 A1    Jul. 26, 2012

(30) Foreign Application Priority Data

Jan. 21, 2011 (CN) .......................... 2011 1 0023780

(51) Int. Cl.
*H01H 9/22* (2006.01)

(52) U.S. Cl.
USPC ......... 200/341; 200/334; 200/50.18; 200/547

(58) Field of Classification Search
USPC ................................................ 200/572, 550
See application file for complete search history.

(56) References Cited

U.S. PATENT DOCUMENTS

| | | | | |
|---|---|---|---|---|
| 5,493,084 A * | 2/1996 | Whitaker et al. | .......... | 200/50.05 |
| 5,657,861 A * | 8/1997 | Takano et al. | .................. | 200/550 |
| 5,818,015 A * | 10/1998 | Lee et al. | ....................... | 219/723 |
| 6,812,416 B2 * | 11/2004 | Tasse | ........................... | 200/50.01 |
| 7,071,427 B2 * | 7/2006 | Houck et al. | .............. | 200/50.05 |
| 7,420,133 B2 * | 9/2008 | Farrow et al. | ............... | 200/50.15 |
| 8,254,089 B2 * | 8/2012 | Cosley et al. | ................. | 361/640 |
| 8,334,469 B2 * | 12/2012 | Takenaka | ................... | 200/50.02 |
| 2012/0160646 A1 * | 6/2012 | Zhang et al. | ................... | 200/336 |
| 2012/0186960 A1 * | 7/2012 | Zhang et al. | ................... | 200/5 A |

* cited by examiner

*Primary Examiner* — Renee Luebke
*Assistant Examiner* — Ahmed Saeed
(74) *Attorney, Agent, or Firm* — Altis & Wispro Law Group, Inc.

(57) ABSTRACT

An exemplary electronic device includes a casing, a first switch, a second switch and a switch control unit. The second switch is connected in parallel with the first switch. The casing includes a side plate and a top plate detachably connected with a top end of the side plate. The first switch is turned on when the top plate mounted to the side plate and turned off when the top plate detached from the side plate. The switch control unit includes a sliding member mounted at the second switch. The sliding member includes a pressing plate and is moveable relative to the side plate between a first position in which the pressing plate aligned with and pressing the second switch to turn on the second switch and a second position in which the pressing plate is staggered with the second switch to turn off the second switch.

20 Claims, 11 Drawing Sheets

ELECTRONIC DEVICE WITH SWITCHES TO SELECTIVELY CONTROL SAFE ACCESS

BACKGROUND

1. Technical Field

The disclosure relates to electronic devices, and particularly to an electronic device with a switch control unit for controlling an automatic power-off function of the electronic device.

2. Description of the Related Art

A conventional computer server system often includes multiple standard servers mounted in a server cabinet. When a side door of the server cabinet of the computer server system is opened by a user, the computer server system automatically powers off, thereby protecting the user's personal safety.

However, some professional staff require the computer server system to remain on when such staff access the computer server system. For example, certain maintenance operations must be carried out while the computer server system is powered on. When the side door of the computer server system is opened for maintenance operations by professional staff, and the computer server system automatically powers off, this inconveniences the professional staff. In addition, the work efficiency of the professional staff is reduced.

What is desired, therefore, is an electronic device which can overcome the above-described shortcomings.

DETAILED DESCRIPTION

Reference will now be made to the drawing figures to describe the present electronic device in detail.

Figure 1:
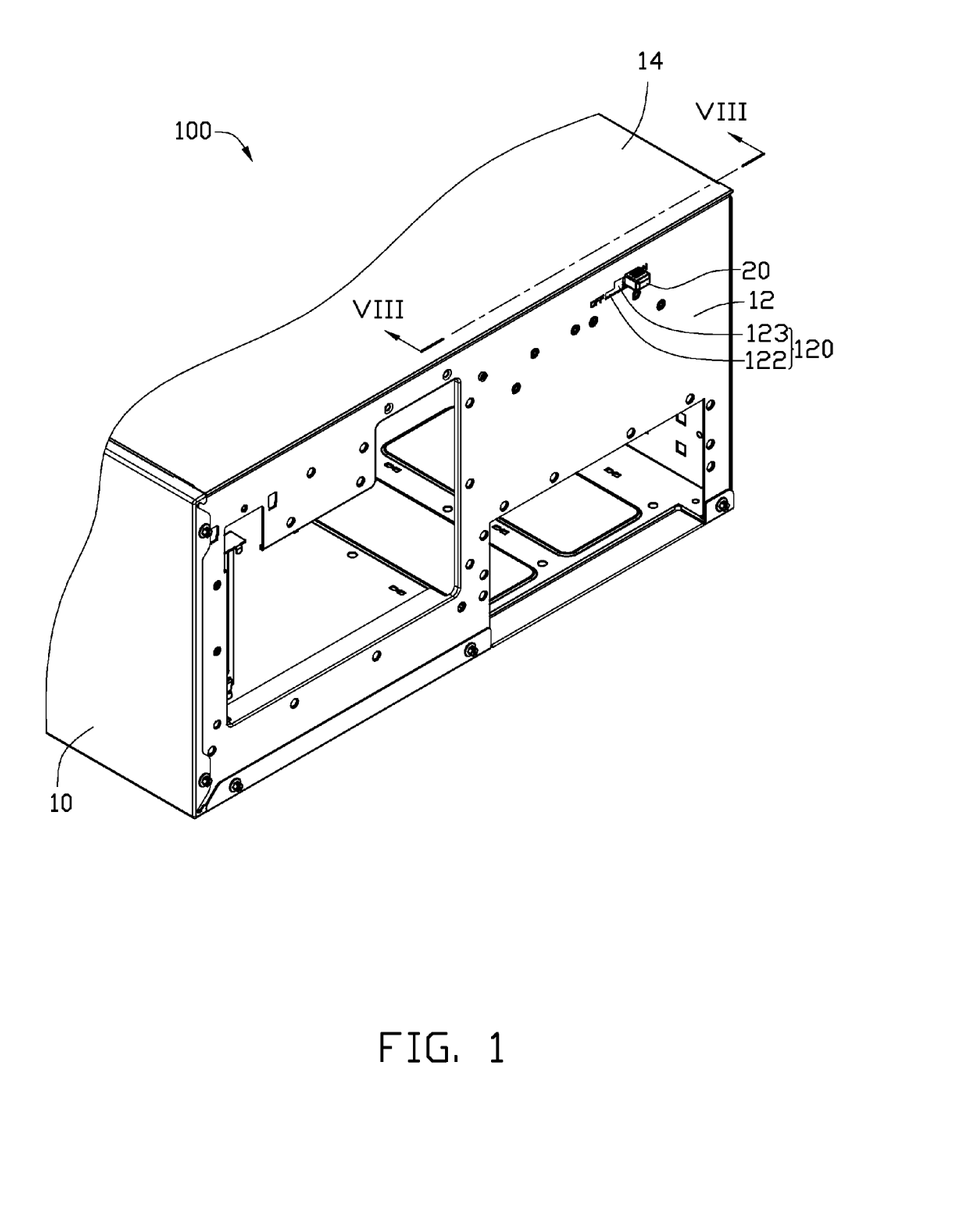
FIG. 1 is a schematic, isometric, assembled view of part of an electronic device in accordance with an exemplary embodiment.
Figure 2:
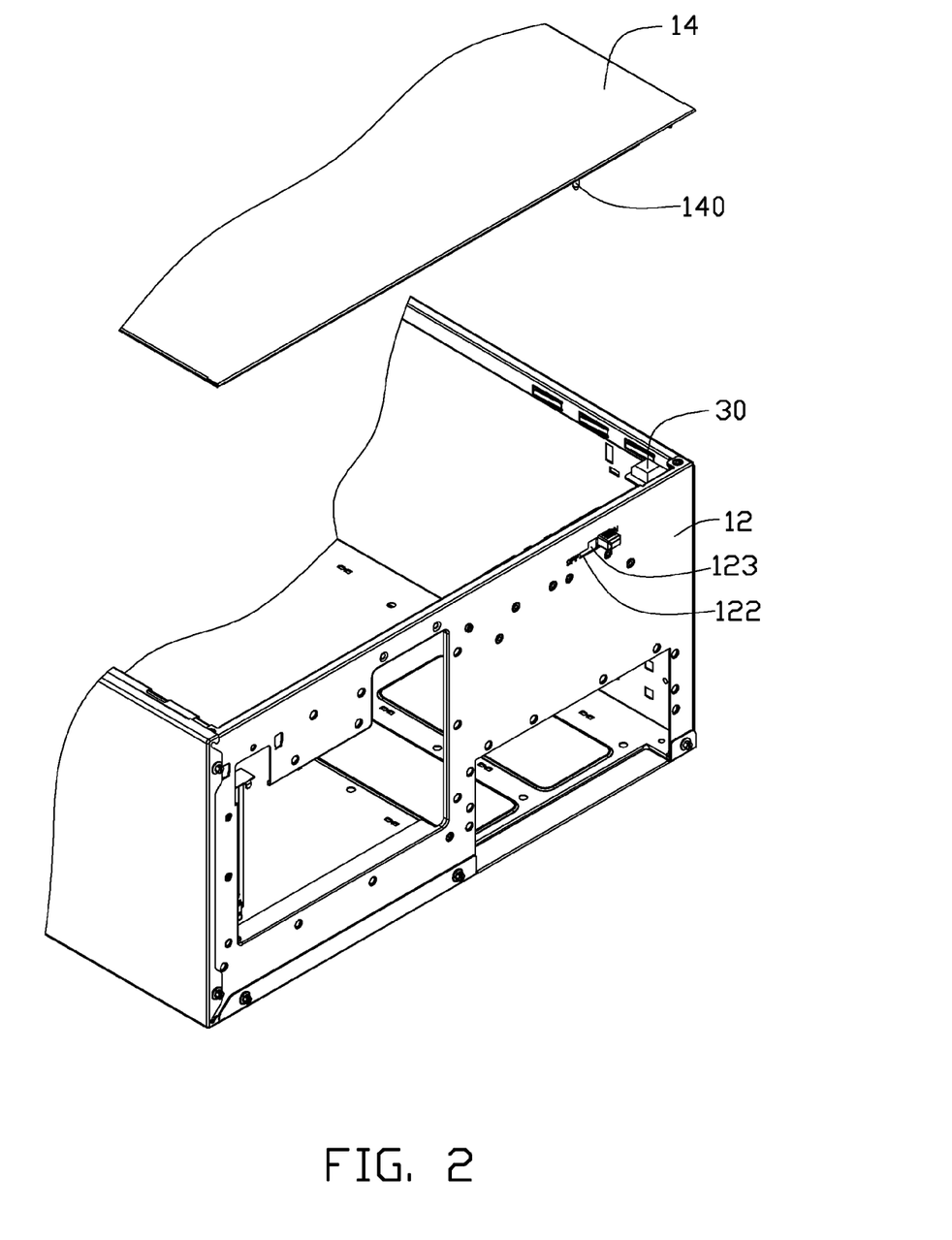
FIG. 2 is similar to FIG. 1, but showing a top plate removed from the electronic device.
Figure 3:
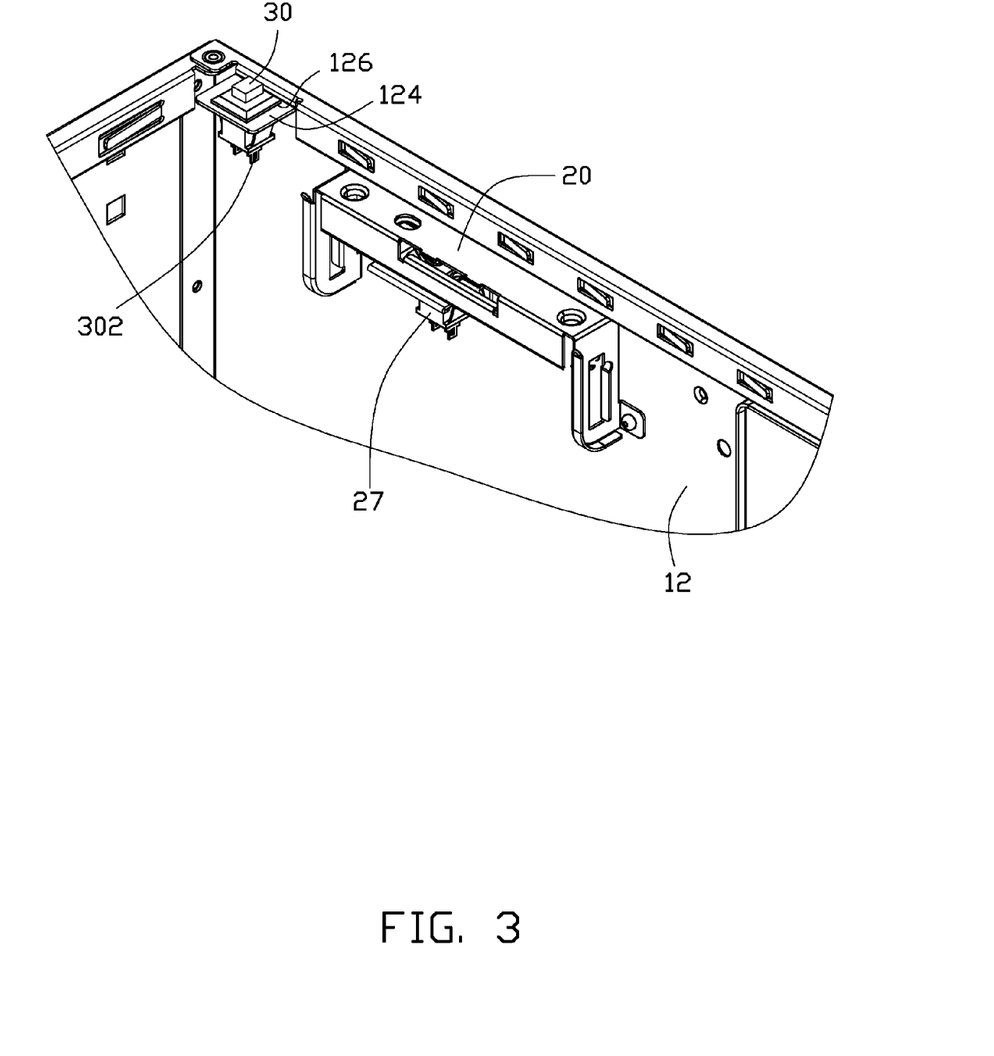
FIG. 3 is an isometric, assembled view of a part of the electronic device of FIG. 1, with the top plate omitted and showing various parts at an inside of a front plate of the electronic device.

Referring to FIGS. 1-3, an electronic device 100 in accordance with an exemplary embodiment includes a casing 10, and a first switch 30, a second switch 27 and a switch control unit 20 received in the casing 10.

The casing 10 is hollow and parallelepiped, and includes a front plate 12 and a top plate 14. The front plate 12 defines therein a locating hole 120 at a position which is adjacent to the top plate 14. The locating hole 120 is generally L-shaped overall, and includes a smaller, slot-shaped, horizontally oriented first hole 122 and a larger second hole 123 perpendicular to the first hole 122. A right end of the first hole 122 communicates with a bottom end of the second hole 123.

The front plate 12 includes a first fixing plate 124 extending perpendicularly and inwardly from a top side thereof towards an interior of the casing 10. In particular, the first fixing plate 124 is located at a right end of the top side of the front plate 12. The first fixing plate 124 is rectangular, and defines a rectangular fixing hole 126 at a central portion thereof. The first switch 30 is mounted in the fixing hole 126 of the first fixing plate 124. The first switch 30 includes two contact legs 302 extending downward from a bottom thereof. The contact legs 302 are electrically connected to a power circuit of the electronic device 100. A top button of the first switch 30 extends upwardly from a main body of the first switch 30 when the first switch 30 is in a first state in which the first switch 30 is turned off. When the first switch 30 is turned off, the electronic device 100 is correspondingly powered off. The top button can be depressed to a position whereby the first switch 30 is in a second state in which the first switch 30 is turned on such that the electronic device 100 is powered on.

The top plate 14 includes a locating pole 140 extending perpendicularly and downward from a position thereof adjacent to the front plate 12. A bottom side of the locating pole 140 is near the locating hole 120 of the front plate 12.

Figure 4:
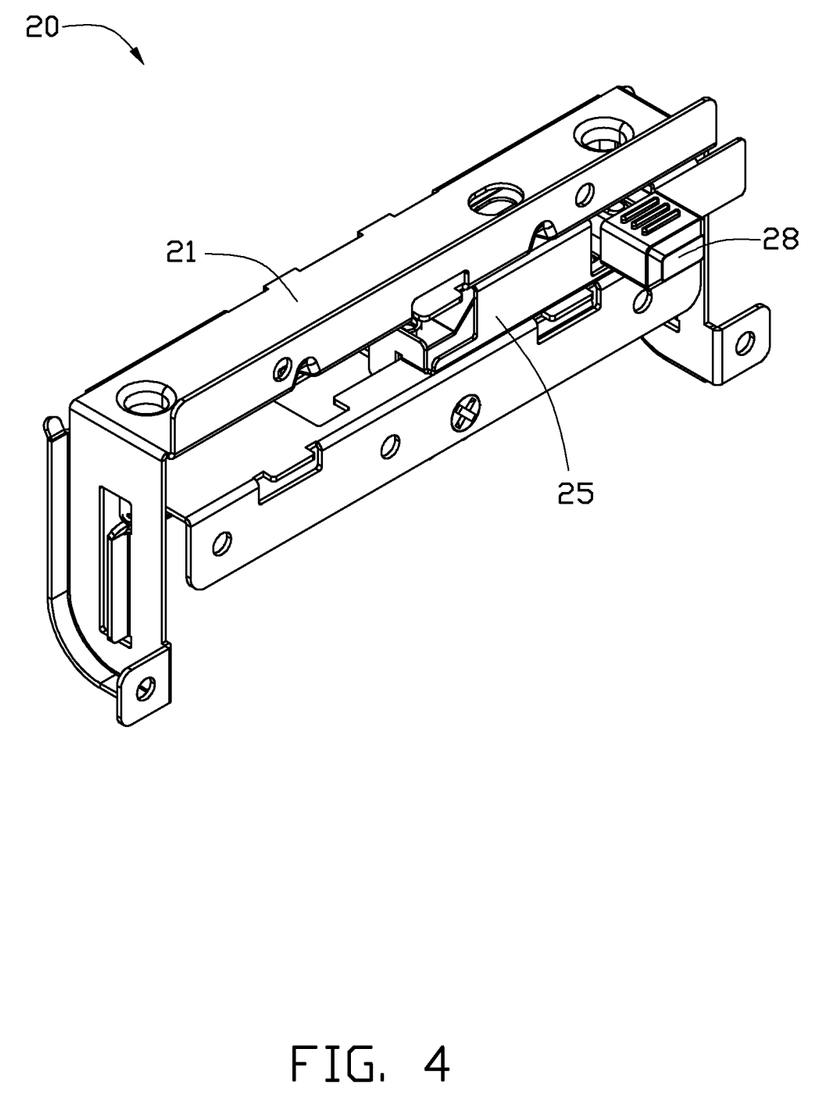
FIG. 4 is an isometric, assembled view of a switch control unit of the electronic device of FIG. 3, shown from a different aspect.
Figure 5:
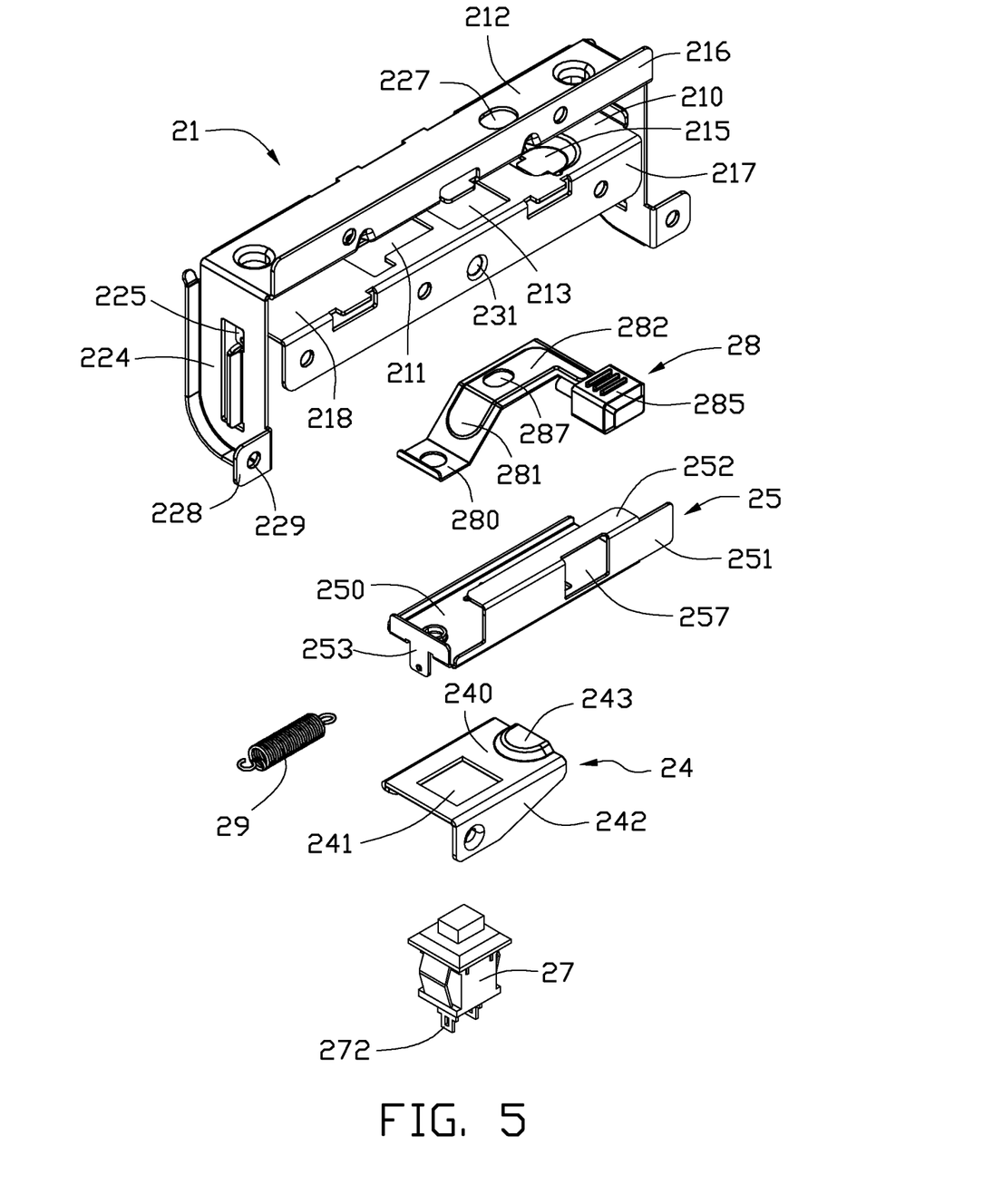
FIG. 5 is an exploded view of the switch control unit of FIG. 4, together with a second switch of the electronic device.
Figure 6:
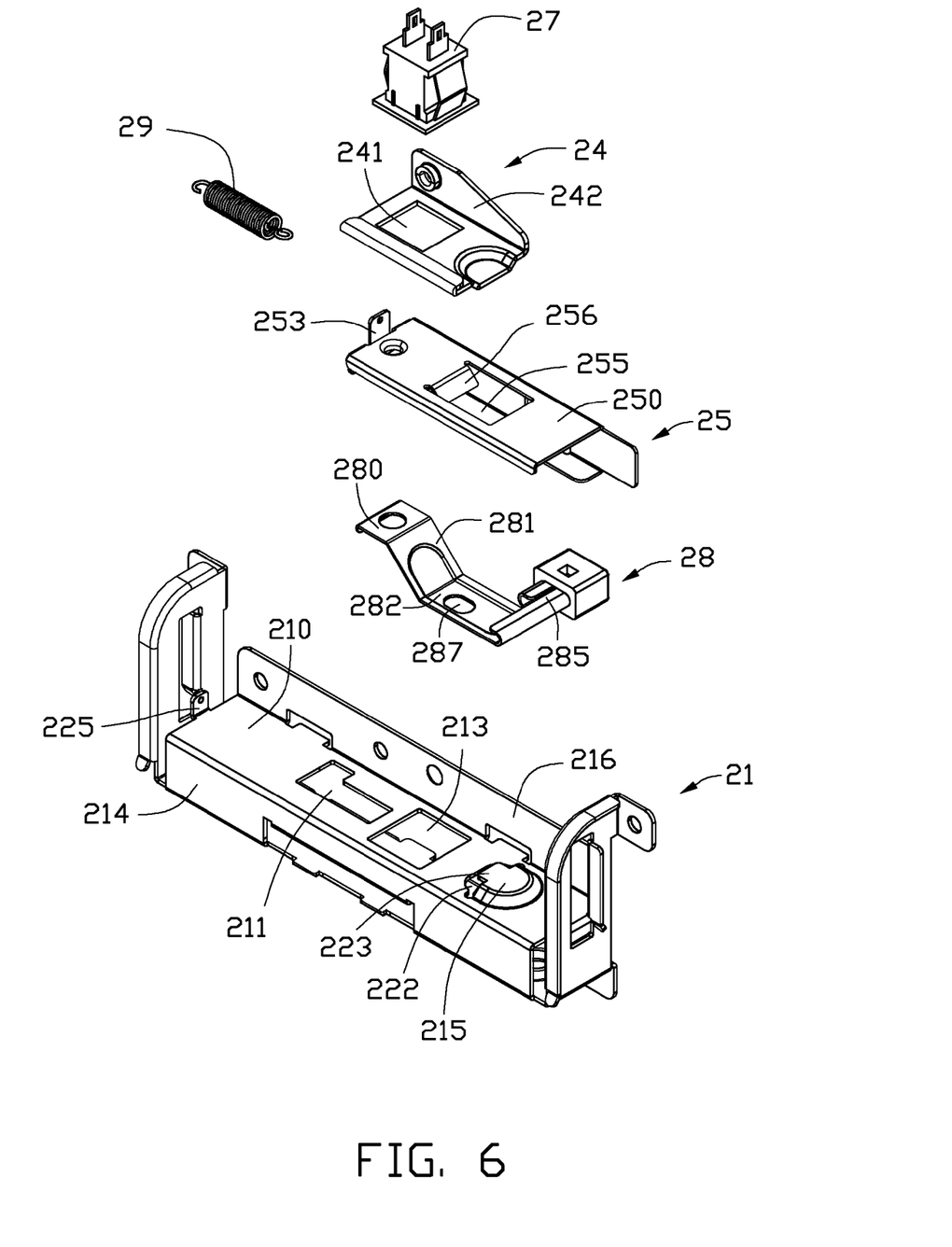
FIG. 6 is an inverted view of the switch control unit and the second switch of FIG. 5.

Referring to FIGS. 4-6, the switch control unit 20 is mounted on the front plate 12, and is located in the interior of the casing 10. The switch control unit 20 includes a fixing frame 21 mounted on the front plate 12, a sliding member 25 located in the fixing frame 21, an operating member 28 connected with the sliding member 25, and an elastic member 29 connected between the sliding member 25 and the fixing frame 21.

The fixing frame 21 includes a bottom wall 210, a top wall 212 spaced from the bottom wall 210, and a middle wall 214 connected between the bottom wall 210 and the top wall 212. The bottom wall 210, the top wall 212 and the middle wall 214 together form a guider 218 for engaging the sliding member 25. A mounting wall 216 upwardly extends from a front edge of the top wall 212, and a mounting wall 217 downward extends from a front edge of the bottom wall 210.

The bottom wall 210 defines a guiding channel 211 and a rectangular opening 213 near but spaced from the guiding channel 211. That is, the guiding channel 211 is located at a left side of the rectangular opening 213 (as viewed in FIG. 5). The bottom wall 210 forms a clasping portion 215 at a right side of the opening 213 (as viewed in FIG. 5). The guiding channel 211 is L-shaped and has a wider left end far from the opening 213. The clasping portion 215 is recessed down from the bottom wall 210, and has an approximately semicircular shape. The clasping portion 215 defines a mouth 222 at an end thereof nearer to the opening 213, for insertion of the second fixing plate 24. A tab 223 extends from the clasping portion 215 toward the opening 213, and is located below the mouth 222. The bottom wall 210 has a connecting portion 225 extending down from a left end thereof. The top wall 212 defines a through hole 227 in alignment with a position between the opening 213 and the clasping portion 215 of the bottom wall 218. The top wall 212 forms two legs 224 extending down from two opposite ends thereof.

The second switch 27 is mounted below the fixing frame 21 by a second fixing plate 24. The second switch 27 includes two contact legs 272 extending downward from a bottom thereof. The contact legs 272 are electrically connected to the power circuit of the electronic device 100. The second switch 27 and the first switch 30 are electrically connected in parallel. A top button of the second switch 27 extends upwardly, whereby the second switch 27 is in a first state in which the second switch 27 is turned off. Accordingly, when the first switch 30 is in the first state (i.e., turned off), and the second switch 27 is in the first state, the electronic device 100 is powered off. The top button of the second switch 27 can be depressed to a position whereby the second switch 27 is in a second state in which the second switch 27 is turned on such that the electronic device 100 is powered on.

The second fixing plate 24 includes a horizontal body 240, and a fixing portion 242 extending down from a front side of the body 240. The body 240 defines a rectangular fixing hole 241. The second switch 27 is mounted in the fixing hole 241 of the second fixing plate 24. The body 240 has a protrusion 243 at a right end thereof (as viewed in FIG. 5), opposite to the rectangular fixing hole 241. The protrusion 243 has an approximately semicircular shape.

The sliding member 25 includes a pressing plate 250, a connecting portion 251 upwardly extending from a front side of the pressing plate 250, and a flange 252 perpendicularly extending from a top side of the connecting portion 251. A guiding portion 253 extends down from a left end of the pressing plate 250 near the fixing hole 241. The pressing plate 250 defines a rectangular opening 255 in a center thereof. A guiding plate 256 extends obliquely upwardly from a left side of the rectangular opening 255 (as viewed in FIG. 5), and is thus inclined relative to the pressing plate 250. The connecting portion 251 defines a rectangular hole 257 at a center thereof, aligned with a right part of the rectangular opening 255.

The operating member 28 is mounted on the sliding member 25. The operating member 28 has a lower end 280 fixed on a left end of the sliding member 25 (as viewed in FIG. 5), an elastic arm 282 spaced from the pressing plate 250 of the sliding member 25, and a middle portion 281 interconnecting the lower end 280 and the elastic arm 282. In the embodiment, the lower end 280 is riveted with the sliding member 25. An operating handle 285 extends from a front, right side of the elastic arm 282 (as viewed in FIG. 5). The operating handle 285 extends through the rectangular hole 257 of the connecting portion 251 of the sliding member 25. The elastic arm 282 defines a through hole 287 therein. The through hole 287 is aligned with the rectangular opening 255 of the sliding member 25, for receiving the locating pole 140 of the top plate 14.

Figure 7:
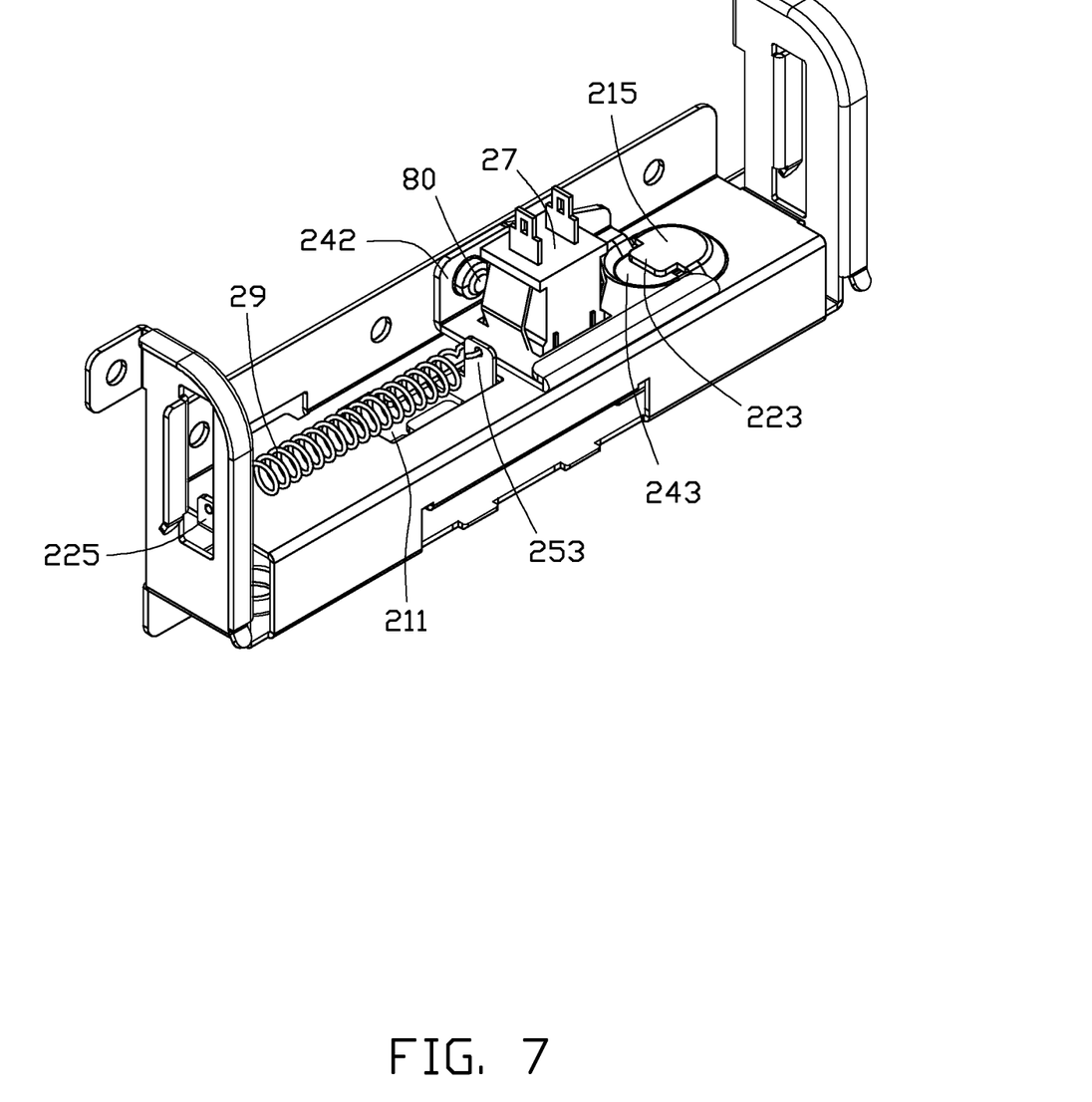
FIG. 7 is an assembled view of the switch control unit with the second switch of FIG. 6, but shown from a different aspect.

Referring also to FIG. 7, in assembly of the switch control unit 20, the sliding member 25 with the operating member 28 is slidably received in the guider 218 formed by the bottom wall 210, the top wall 212 and the middle wall 214. The pressing plate 250 of the sliding member 25 contacts a top surface of the bottom wall 210. The guiding portion 253 of the sliding member 25 extends downward through the guiding channel 211 of the bottom wall 210. The elastic member 29 connects the guiding portion 253 and the connecting portion 225 of the bottom wall 210. The second switch 27 is mounted in the second fixing plate 24. The fixing portion 242 is mounted on the mounting wall 217 of the fixing frame 21 by screws (not shown). The protrusion 243 is engaged with the tab 223 of the clasping portion 215 of the fixing frame 21. The top button of the second switch 27 extends upward through the rectangular opening 213 of the bottom wall 210 and the rectangular opening 255 of the pressing plate 250. The switch control unit 20 is mounted on the front plate 12, with the operating handle 285 of the sliding member 25 extending through the locating hole 120 of the front plate 12. The operating handle 285 can be moved in the locating hole 120 to drive the sliding member 25 to slide in the guider 218 and thereby control the state of the second switch 27.

Figure 8:
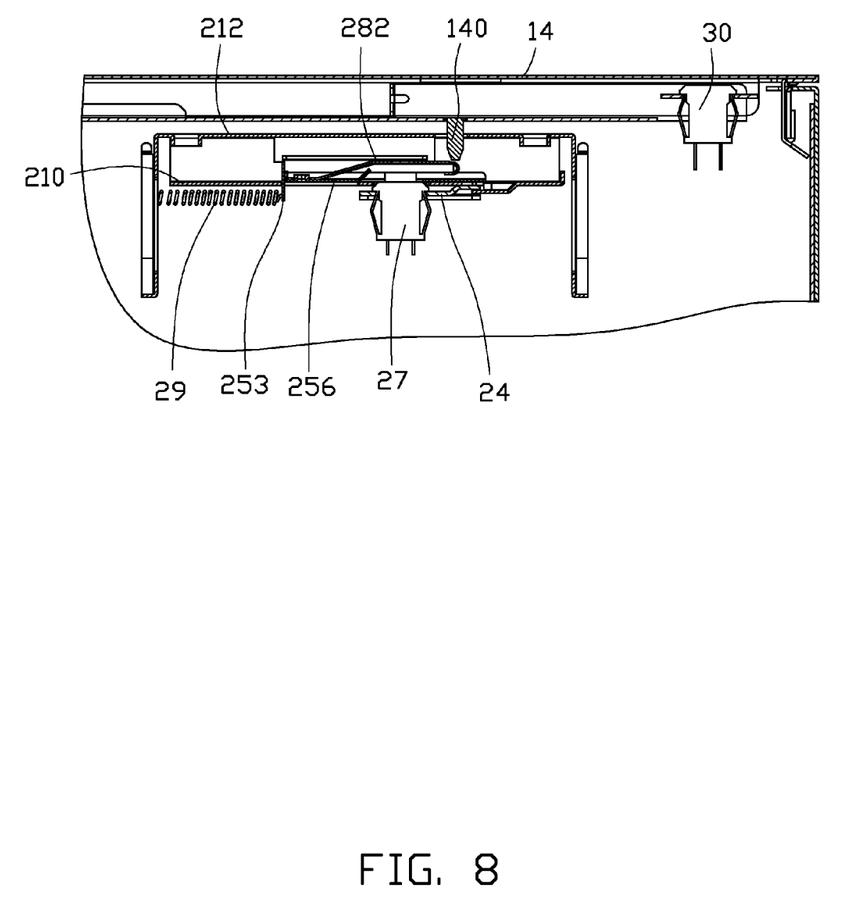
FIG. 8 is a cross-sectional view of part of the electronic device of FIG. 1, taken along a line VIII-VIII thereof, and showing a sliding member in a first position and the second switch in an open state.

Referring also to FIG. 8, when the operating handle 285 is located in the first hole 122 of the front plate 12, the sliding member 25 is at a first position. The operating handle 285 abuts a left edge of the first hole 122, and the elastic member 29 is in an essentially unloaded (relaxed) state. The top button of the second switch 27 extends upwardly; thus, the second switch 27 is in the first state and turned off. The top plate 14 presses the top button of the first switch 30 down such that the first switch 30 is in the second state in which the first switch 30 is turned on. Since the second switch 27 and the first switch 30 are electrically connected in parallel, the electronic device 100 is powered on. If the top plate 14 is opened (i.e., detached even partly) by a user, the first switch 30 is turned off due to the absence of pressure applied by the top plate 14. Thus when the top plate 14 is opened, since the first switch 30 and the second switch 27 are both turned off, the electronic device 100 is automatically powered off to protect the user's personal safety.

Figure 9:
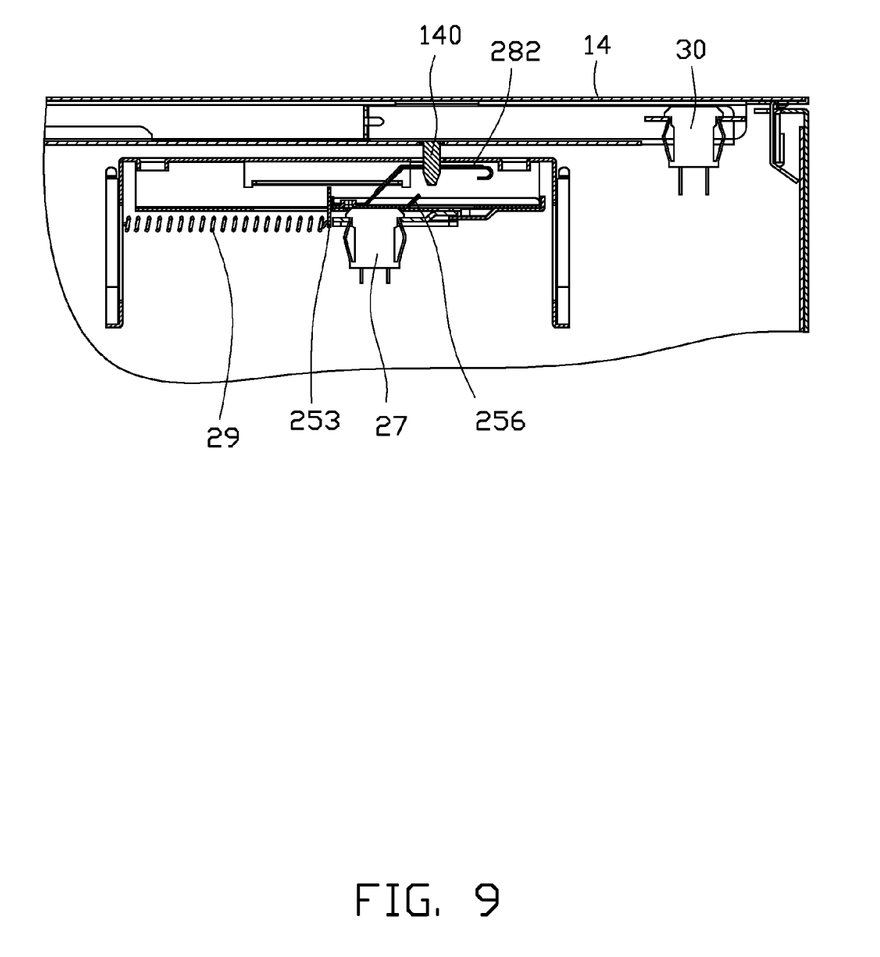
FIG. 9 is similar to FIG. 8, but showing the sliding member in a second position and the second switch in a closed state.

Referring also to FIG. 9, when the operating handle 285 is urged to move from the first hole 122 to the second hole 123 of the front plate 12 by manual operation by the user, the sliding member 25 slides from the left end of the bottom wall 210 of the fixing frame 21 to a right end of the bottom wall 210 such that the sliding member 25 is at a second position. The through hole 287 of the elastic arm 282 is aligned with the locating pole 140 of the top plate 14. The elastic arm 282 rises by elasticity thereof whereby the through hole 287 of the elastic arm 282 receives the locating pole 140. The operating handle 285 abuts against a top edge and a right edge of the second hole 123. The guiding portion 253 of the sliding member 25 slides in the guiding channel 211 of the bottom wall 210 from left to right. The elastic member 29 is stretched to provide an elastic force applied to the elastic arm 282 of the operating member 28 to maintain the elastic arm 282 in position abutting against a right side of the locating pole 140 of the top plate 14. In other words, the locating pole 140 provides a holding force applied to the right edge of the through hole 287 of the elastic arm 282 to maintain the sliding member 25 at the second position. Simultaneously, the pressing plate 250 with the guiding plate 256 has moved horizontally to the right to press the top button of the second switch 27. Thereby, the pressing plate 250 maintains the second switch 27 in the turned on position, and the electronic device 100 remains powered on.

Figure 10:
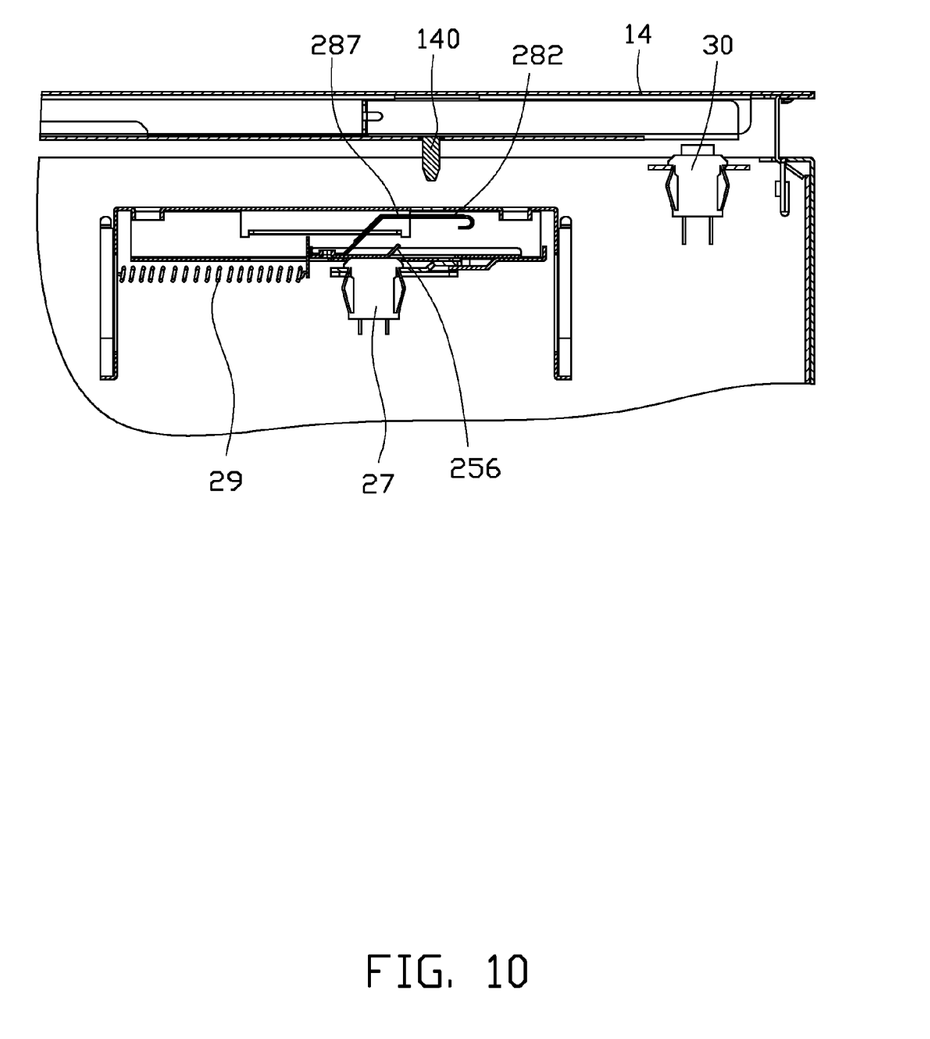
FIG. 10 is similar to FIG. 9, but showing the sliding member in a third position and the top plate being detached from the electronic device.

Referring to FIG. 10, when the sliding member 25 is at the second position and the top plate 14 is opened by the user, the first switch 30 is turned off due to the absence of pressure of the top plate 14, as described above. Since the second switch 27 and the first switch 30 are electrically connected in parallel and the second switch 27 is turned on in the second state, the electronic device 100 remains powered on. Thus, the electronic device 100 can remain powered on when the top plate 14 is opened, under control of the switch control unit 20. Accordingly, the electronic device 100 can realize its automatic power-off function according to different requirements of users. After the top plate 14 is detached from the casing 10, the fixing pole 140 is removed from the casing 10 together with the top plate 14. Thus, the holding force applied to the through hole 287 of the elastic arm 282 is withdrawn, the elastic member 29 rebounds and draws the sliding member 25 back to a third position, and the operating handle 285 correspondingly moves reversely to abut against a left edge (and the top edge) of the second hole 123.

Figure 11:
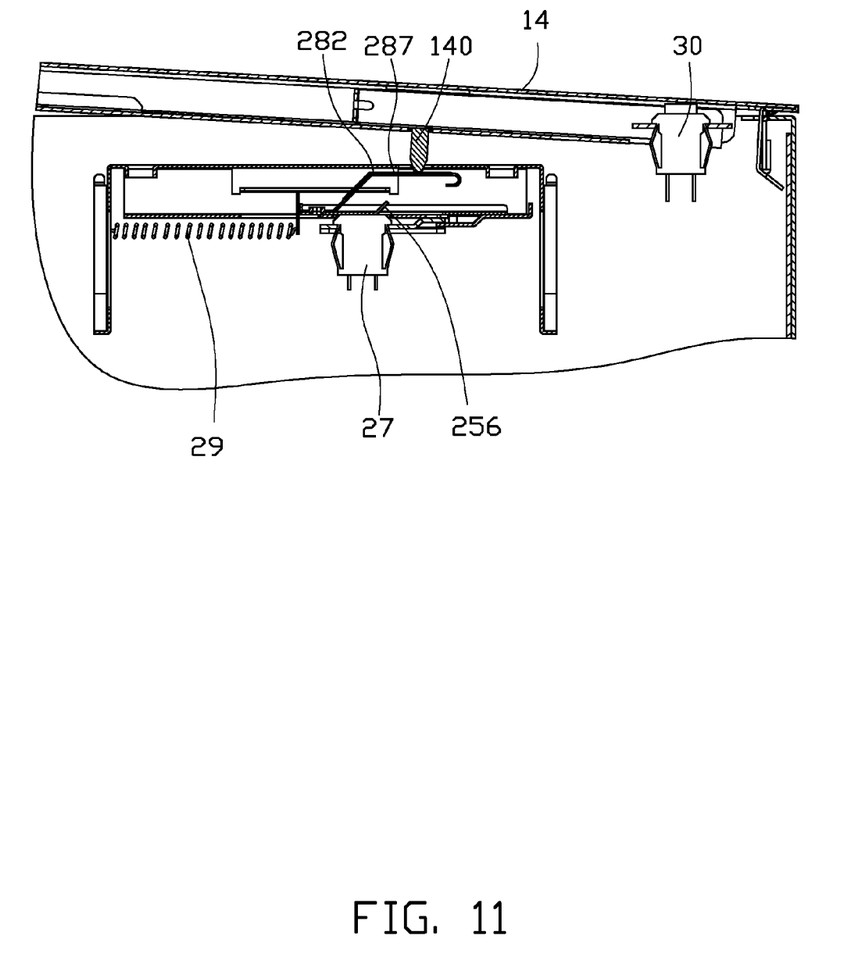
FIG. 11 is similar to FIG. 10, but showing the top plate being installed back onto the electronic device.

Referring to FIG. 11, when the top plate 14 is mounted on top of the casing 10 of the electronic device 100, downward pressing force is applied to the first switch 30 by the top plate 14 such that the first switch 30 is turned on. Since the sliding member 25 with the operating member 28 is back at the third position, the through hole 287 of the elastic arm 282 is offset from the locating pole 140 of the top plate 14. The locating pole 140 begins to press the elastic arm 282 down and accordingly also begins to move the operating handle 285 down. When the top plate 14 fully covers the top of the casing 10, the locating pole 140 of the top plate 14 has pushed the operating member 28 all the way down and accordingly forced the operating handle 285 to reach a position at the bottom of the second hole 123 adjacent to a right end of the first hole 122. The sliding member 25 together with the operating member 28 is moved from right to left by elastic restitution of the elastic member 29 until the operating handle 28 abuts a left edge of the first hole 122. Thus, the sliding member 25 moves from the third position back to the first position shown in FIG. 8. When the sliding member 25 is at the first position, the top of the second switch 27 extends upward through the rectangular opening 255 of the pressing plate 250, and thus the second switch 27 is turned off. Due to the first switch 30 and the second switch 27 being connected in parallel, and the first switch 30 being in the second state in which the first switch 30 is turned on, the electronic device 100 remains powered on.

It is to be further understood that even though numerous characteristics and advantages have been set forth in the foregoing description of the embodiment(s), together with details of the structures and functions of the embodiment(s), the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. An electronic device, comprising:
   a casing comprising a side plate, and a top plate detachably connected with a top end of the side plate;
   a first switch mounted on the side plate, the first switch being turned on when the top plate is connected to the side plate and being turned off when the top plate is detached from the side plate;
   a second switch mounted on the side plate and electrically connected in parallel with the first switch; and
   a switch control unit comprising a sliding member mounted at one end of the second switch and an operating member fixedly mounted on the sliding member, the sliding member comprising a pressing plate, the sliding member being operated by the operating member to be movable relative to the side plate between a first position in which the pressing plate is offset from the second switch leaving the second switch in a turned off state, and a second position in which the pressing plate is aligned with and presses the second switch to turn on the second switch.

2. The electronic device as described in claim 1, wherein the switch control unit further comprises a fixing frame mounted on the side plate, the fixing frame having a guider to movably receive the sliding member.

3. The electronic device as described in claim 2, wherein the switch control unit further comprises an elastic member connected between the sliding member and the fixing frame.

4. The electronic device as described in claim 2, wherein the fixing frame defines an opening and a guiding channel, the pressing plate of the sliding member defining an opening therein and forming a guiding portion received in the guiding channel, and the opening of the pressing plate aligned with the opening of the fixing frame for extension of a top of the second switch when the sliding member is in the first position.

5. The electronic device as described in claim 4, wherein the pressing plate forms a guiding plate extending obliquely upwardly from a side of the opening of the pressing plate.

6. The electronic device as described in claim 4, wherein the switch control unit further comprises an elastic member connected between the guiding portion of the sliding member and the fixing frame.

7. The electronic device as described in claim 2, wherein the operating member comprises an elastic arm fixedly connected with and spaced from the sliding member, and an operating handle extending outward from the elastic arm, the operating handle extending through the side plate to protrude out of the casing.

8. The electronic device as described in claim 7, wherein the side plate defines a locating hole therein for receiving the operating handle of the operating member, and the locating hole comprises a first hole and a second hole communicated with the first hole; and when the operating handle is located in the first hole, the second switch is turned off; and when the operating handle is located in the second hole, the second switch is turned on.

9. The electronic device as described in claim 8, wherein the top plate comprises a locating pole extending downward therefrom, the locating pole of the top plate engaging in a through hole of the elastic arm such that a holding force is applied to the elastic arm for maintaining the second switch as turned on when the sliding member is in the second position.

10. The electronic device as described in claim 1, wherein the sliding member is horizontally moveable relative to the side plate between the first position and the second position to press the second switch when the sliding member is in the second position.

11. An electronic device, comprising:
    a casing comprising a side plate, and a top plate detachably connected with a top end of the side plate;
    a first switch mounted on the side plate, the first switch being pressed by the top plate and turned on when the top plate is connected to the side plate and being unpressed and turned off when the top plate is detached from the side plate;
    a second switch mounted on the side plate, the second switch comprising a contact end and being electrically connected in parallel with the first switch; and
    a switch control unit comprising a sliding member mounted at the contact end of the second switch, the sliding member comprising a pressing plate, the sliding member being movable relative to the side plate between a first position in which the pressing plate is offset from the second switch with the second switch in a turned off state, and a second position in which the pressing plate is aligned with and presses the contact end of the second switch to turn on the second switch.

12. The electronic device as described in claim 11, wherein the switch control unit further comprises a fixing frame mounted on the side plate, the fixing frame having a guider to movably receive the sliding member sliding in the guider.

13. The electronic device as described in claim 12, wherein the switch control unit further comprises an elastic member connected between the sliding member and the fixing frame.

14. The electronic device as described in claim 12, wherein the fixing frame defines an opening and a guiding channel, the pressing plate of the sliding member defining an opening therein and forming a guiding portion received in the guiding channel, and the opening of the pressing plate aligned with the opening of the fixing frame for extension of a top of the second switch when the sliding member in the first position.

15. The electronic device as described in claim 14, wherein the fixing frame comprises a bottom wall, a top wall spaced from the bottom wall, and a middle wall connected between the bottom wall and the top wall, the bottom wall, top wall and the middle wall together forming the guider, the opening and the guiding channel defined in the bottom wall.

16. An electronic device, comprising:
a casing comprising a side plate, and a top plate detachably connected with a top end of the side plate, the top plate comprising a locating pole extending downward;
a first switch mounted on the side plate, the first switch being turned on by urging of the top plate when the top plate is connected to the side plate and being turned off when the top plate is detached from the side plate;
a second switch mounted on the side plate and being electrically connected in parallel with the first switch; and
a switch control unit comprising a sliding member mounted at one end of the second switch and an operating member fixedly mounted on the sliding member, the sliding member comprising a pressing plate;
the sliding member being operable by the operating member to move relative to the side plate from a first position in which the pressing plate is offset from the second switch leaving the second switch in a turned off state, to a second position in which the pressing plate presses the second switch to turn on the second switch and the locating pole of the top plate extends through the sliding member and thereby holds the sliding member in place; and
the sliding member being further operable by the locating pole when the top plate is detached from the side plate to move relative to the side plate from the second position to a third position in which the pressing plate continues to press the second switch to keep the second switch turned on and the operating member abuts the side plate and thereby holds the sliding member in place.

17. The electronic device as described in claim 16, wherein the side plate defines a locating hole therein for receiving an operating handle of the operating member, and the locating hole comprises a first hole and a second hole communicated with the first hole; and when the operating handle is located in the first hole, the second switch is turned off; and when the operating handle is located in the second hole, the second switch is turned on.

18. The electronic device as described in claim 17, wherein the first hole has a horizontal end communicating with a bottom end of the second hole, when the sliding member is in the third position, the operating member abutting against a horizontal side of the second hole and near the first hole.

19. The electronic device as described in claim 17, wherein the operating member comprises an elastic arm fixedly connected with and spaced to the sliding member, the operating handle extending outward from the elastic arm and through the side plate to protrude out of the casing, when the operating handle is located in the second hole, the operating handle abutting against a top side of the second hole by an elastic force of the elastic arm.

20. The electronic device as described in claim 16, wherein the switch control unit further comprises a fixing frame mounted on the side plate, the fixing frame having a guider to receive the sliding member sliding in the guider, the switch control unit further comprising an elastic member connected between the sliding member and the fixing frame.

* * * * *